United States Patent
Fujisaki

(10) Patent No.: US 7,507,079 B2
(45) Date of Patent: Mar. 24, 2009

(54) ROTARY POWDER COMPRESSION MOLDING MACHINE

(75) Inventor: Katsuhito Fujisaki, Kyoto (JP)

(73) Assignee: Kikusui Seisakusho Ltd., Kyoto-shi (JP)

( * ) Notice: Subject to any disclaimer, the term of this patent is extended or adjusted under 35 U.S.C. 154(b) by 399 days.

(21) Appl. No.: 11/386,706

(22) Filed: Mar. 23, 2006

(65) Prior Publication Data

US 2007/0077324 A1    Apr. 5, 2007

(30) Foreign Application Priority Data

Sep. 30, 2005    (JP) .............................. 2005-285940

(51) Int. Cl.
*B29C 43/02*    (2006.01)

(52) U.S. Cl. ..................... 425/146; 425/149; 425/345

(58) Field of Classification Search ................. 425/146, 425/149, 344–345, 348 R
See application file for complete search history.

(56) References Cited

U.S. PATENT DOCUMENTS

| | | | | |
|---|---|---|---|---|
| 5,206,034 | A | * | 4/1993 | Yamazaki .................... 425/145 |
| 5,209,936 | A | * | 5/1993 | Ihara et al. .................... 425/149 |
| 6,676,863 | B2 | * | 1/2004 | Christiaens et al. ......... 425/345 |
| 6,972,105 | B2 | * | 12/2005 | Boeckx et al. .............. 425/345 |

2004/0191347 A1    9/2004  Boeckx et al.

FOREIGN PATENT DOCUMENTS

JP    11-19799    1/1999

* cited by examiner

*Primary Examiner*—Yogendra Gupta
*Assistant Examiner*—Thu Khanh T Nguyen
(74) *Attorney, Agent, or Firm*—Westerman, Hattori, Daniels & Adrian, LLP.

(57) ABSTRACT

In a rotary powder compression molding machine in which a rotary turret is provided within a frame via a vertical shaft so as to be horizontally rotatable, a plurality of dies are provided in the rotary turret at a predetermined interval, an upper punch and a lower punch are held kept above and below each of the dies so as to be vertically slidable, a powder filled in the die is compressed and molded by putting the upper punch and the lower punch in which punch tips are inserted into the dies through a portion between an upper roll and a lower roll, a joint apparatus coupling the vertical shaft and the rotary turret so as to be able to detach the rotary turret from the vertical shaft, comprises a coupling mechanism coupling the vertical shaft and the rotary turret while maintaining a state in which the vertical shaft and the rotary turret are constrained in an axial direction of the vertical shaft with each other, and canceling the coupling between the vertical shaft and the rotary turret by canceling the constraining state on the basis of an operation; and a coupling detecting mechanism detecting a fact that the rotary turret is coupled to the vertical shaft by the coupling mechanism.

4 Claims, 4 Drawing Sheets

ROTARY POWDER COMPRESSION MOLDING MACHINE

BACKGROUND OF THE INVENTION

1. Field of the Invention

The present invention relates to a rotary powder compression molding machine for manufacturing a tablet and a food product, and further an electronic part and the like.

2. Description of the Related Art

Conventionally, for example, a medical tablet is manufactured by compressing a powder corresponding to a raw material of the medical tablet. A rotary powder compression molding machine for manufacturing such a tablet mentioned above is provided with a rotary turret, a plurality of dies arranged at a predetermined interval in a circumferential direction of the rotary turret, upper and lower punches arranged per the dies in such a manner that a leading end can be inserted into the dies, upper and lower rolls for generating a compression force in the punches, and a vertical shaft rotating the rotary turret. Further, in the case that the upper and lower punches pass through a portion between the upper and lower rolls, a powder filled within the die is compressed by the upper and lower punches, thereby forming a tablet.

In the rotary powder compression molding machine mentioned above, there has been known a machine structured such that the rotary turret can be detached from the vertical shaft, for manufacturing plural kinds of tablets by one machine, or for facilitating a cleaning within the machine. For example, in Japanese Unexamined Patent Publication No. H11-19799, there is described a gear coupling constituted by a pair of gears and provided annularly with a plurality of teeth each having a trapezoidal cross sectional shape, as a joint mechanism. The gear coupling is structured such that one of a pair of gears is attached to the vertical shaft, the other gear is attached to the rotary turret, and the respective teeth are engaged with each other so as to couple the rotary turret to the vertical shaft.

In accordance with the structure mentioned above, since the rotary turret and the vertical shaft are engaged with each other in the teeth of the respective gears, that is, a pair of gears are coupled in a state in which a pair of gears are not constrained in an axial direction of the vertical shaft, it is possible to easily cancel the engagement by pulling up the rotary turret so as to separate the rotary turret from the vertical shaft. As a result, it is possible to bring the rotary turret out of the machine, and it is possible to clean up and/or exchange the rotary turret.

However, as mentioned above, since the gear coupling is not in a state of being constrained in the direction of the axial core of the vertical shaft in such a manner that the respective gears are not separated from each other, a great force is applied to the respective teeth if the vertical shaft rotates and is going to rotate the rotary turret, and a force pushing up the rotary turret on the basis of the force is applied to the rotary turret. In order to prevent the rotary turret from floating up, in the Japanese Unexamined Patent Publication No. H11-19799 mentioned above, a sufficient force to cancel the upward force is applied to the rotary turret during a time when the rotary turret is coupled to the vertical shaft.

Accordingly, in comparison with the structure which is not provided with the joint mechanism mentioned above, a great force (load) is applied to a bearing supporting the vertical shaft, a useful life of the bearing is shortened. Further, since a mechanism for pressing the rotary turret is installed above the rotary turret, the mechanism takes much possession of a space within the machine, thereby enlarging a size of the machine.

Further, since the mechanism for pressing the rotary turret is necessary, there is generated a necessity of changing a layout of piping and wiring within a frame, and a layout of a mechanism for supplying the powder and the like with respect to a layout of a standard molding machine. Accordingly, an increase of a man-hour is caused in the manufacturing in addition to a designing, and a manufacturing cost is increased as a whole.

Further, since the joint mechanism is positioned between the rotary turret and the vertical shaft, it is impossible to visually observe the coupling state. Accordingly, even if the coupling is executed in a state in which a foreign matter is intervened between the teeth of the gear coupling, it is impossible to check the state.

Further, since various constituting parts structuring the mechanism mentioned above come close to a so-called tablet making area in which the upper punch above the rotary turret, a guide rail and the like are arranged, an efficiency of the cleaning work for the tablet making area and the mechanism is lowered.

SUMMARY OF THE INVENTION

Thus, an object of the present invention is to solve the problem mentioned above.

Specifically, in accordance with the present invention, there is provided a rotary powder compression molding machine in which a rotary turret is provided within a frame via a vertical shaft so as to be horizontally rotatable, a plurality of dies are provided in the rotary turret at a predetermined interval, an upper punch and a lower punch are held kept above and below each of the dies so as to be vertically slidable, a powder filled in the die is compressed and molded by putting the upper punch and the lower punch in which punch tips are inserted into the dies through a portion between an upper roll and a lower roll, comprising a joint apparatus coupling the vertical shaft and the rotary turret so as to be able to detach the rotary turret from the vertical shaft, wherein the joint apparatus comprises a coupling mechanism coupling the vertical shaft and the rotary turret while maintaining a state in which the vertical shaft and the rotary turret are constrained in an axial direction of the vertical shaft with each other, and canceling the coupling between the vertical shaft and the rotary turret by canceling the constraining state on the basis of an operation; and a coupling detecting mechanism detecting a fact that the rotary turret is coupled to the vertical shaft by the coupling mechanism.

In the structure mentioned above, the vertical shaft and the rotary turret are coupled by the joint apparatus, however, since the coupling mechanism constituting the joint apparatus sets the vertical shaft and the rotary turret to the state in which the vertical shaft and the rotary turret are constrained with each other in the axial direction of the vertical shaft, the rotary turret does not float up from vertical shaft in the case that the vertical shaft rotates. Accordingly, the mechanism for suppressing the floating of the rotary turret is not necessary, a manufacturing cost is lowered, and the cleaning work in the space above the rotary turret in which the mechanism for supplying the powder and the like are arranged is easily executed.

Further, since the coupling detecting mechanism detects the coupling state between the rotary turret and the vertical shaft, it is possible to check the coupling even if the visual observation can not be executed, so that it is possible to improve a safety of a coupling work.

The coupling mechanism is preferably structured, in particular, such that the coupling mechanism comprises a constrained member attached to one of the rotary turret and the vertical shaft, and a constraining means attached to an opposite position to the constrained member so as to constrain the constrained member on the basis of an resilient force, the constraining means actuating in an opposite direction to the resilient force to relieve a constrained state by being supplied a fluid having a fluid pressure over the resilient force.

Further, it is preferable that the coupling detecting mechanism comprises a gas supply means for supplying a gas in such a manner that the constraining means passes between contact surfaces with which the constraining means is brought into contact at a time of constraining the constrained member, and a detecting means for detecting a charge of gas property, the change which is being caused by a flow of the gas supplied by the gas supplying means being limited by the portion between the connect surfaces. The gas property change means a change of a flow rate and a pressure which correspond to the gas property. The property change of the detected gas may be constituted by one of the flow rate and the pressure. Further, as the detecting means mentioned above, a pressure gauge detecting the change of the gas pressure is preferable.

Each of the means constituting the coupling mechanism is particularly structured such that the constrained member comprises a through hole, the through hole providing a taper surface portion defined by a large inner diameter portion and a small inner diameter portion having a smaller diameter than the large inner diameter portion, and an annular convex portion having a smaller inner diameter than the small inner diameter portion of the taper surface portion, and the constraining means comprises a case providing a projection portion having a taper outer surface corresponding to the taper surface portion of the constrained member, a plurality of spherical bodies held so as to be movable in a position near the taper outer surface of the projection portion, a spherical body pressing member having a rod portion arranged within the case and pressing each of the spherical bodies against the annular convex portion when the rotary turret and the vertical shaft are in a coupling state, and a transmission portion coupled to the rod portion and arranged within the case in a state of being partly exposed from the interior of the case, a resilient body supplying a resilient force to the spherical body pressing member, and a base member having a concave portion capable of installing the case in the portion where the spherical body pressing member is exposed in a liquid tight manner, thereby relieving the constraint of the constrained member by introducing a fluid to the concave portion of the base member.

Since the present invention is structured as mentioned above, and the coupling mechanism couples the vertical shaft and the rotary turret while maintaining the state in which the vertical shaft and the rotary turret are constrained with each other in the axial direction of the vertical shaft, whereby the mechanism for preventing the rotary turret from floating up is not necessary, it is possible to reduce the manufacturing cost and it is possible to make the structure compact. Further, since the coupling state can be detected by the coupling detecting mechanism, it is possible to improve a safety of the coupling work.

DETAILED DESCRIPTION OF THE INVENTION

A description will be given below of an embodiment in accordance with the present invention with reference to FIGS. 1 to 4.

Figure 1:
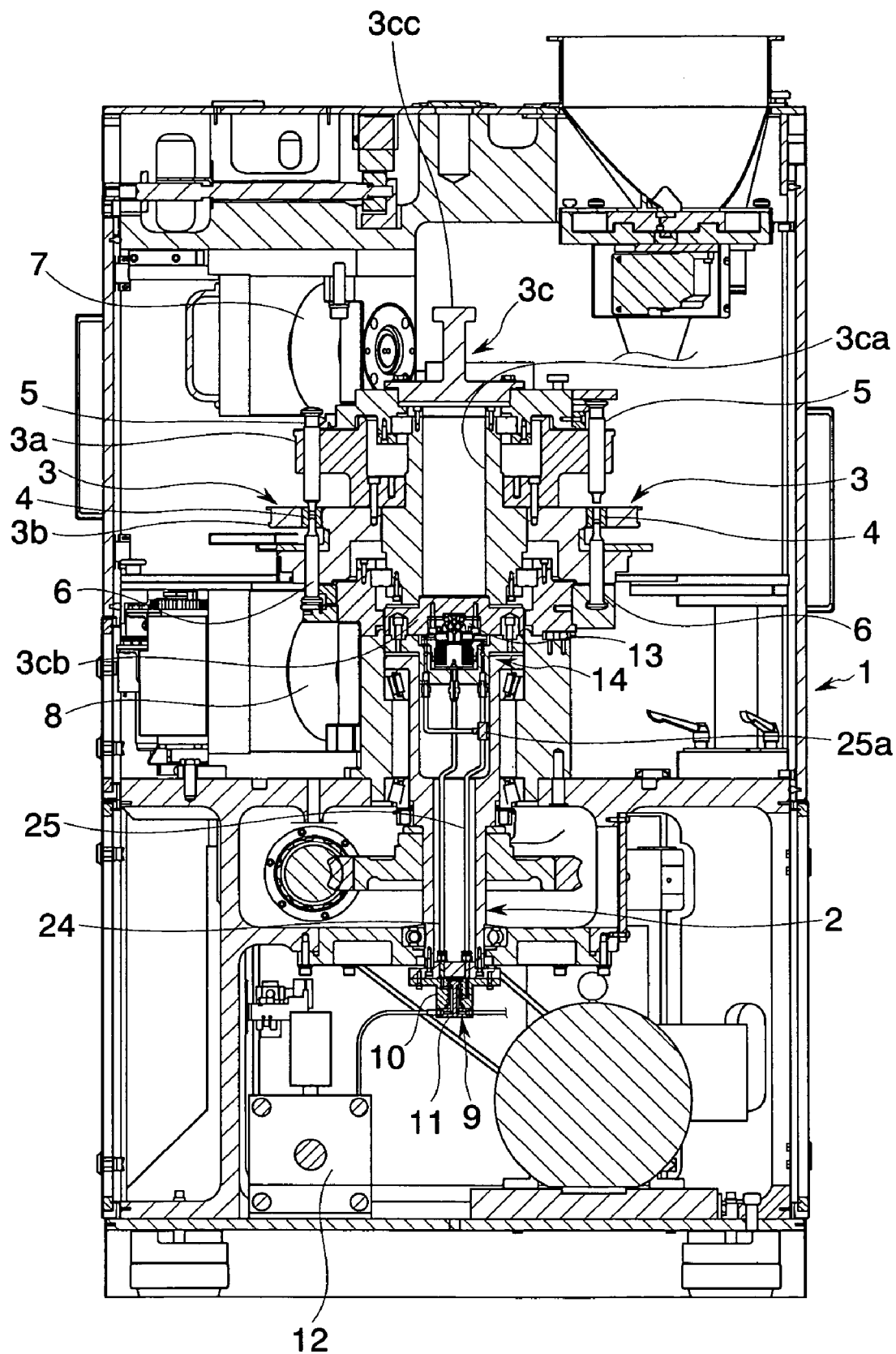
FIG. 1 is a cross sectional view showing an entire structure of an embodiment in accordance with the present invention.

A rotary powder compression molding machine (hereinafter, refer to as a molding machine) in accordance with the embodiment shown in FIG. 1 is structured such that a rotary turret 3 is provided within a frame 1 via a vertical shaft 2 so as to be horizontally rotatable, a plurality of dies 4 are provided in the rotary turret 3 at a predetermined interval, and an upper punch 5 and a lower punch 6 are held in each of the dies 4 so as to be vertically slidable. Further, the molding machine compresses and molds a powder filled within the die 4 by putting the upper punch 5 and the lower punch 6 through a portion between an upper roll 7 and a lower roll 8 in a state in which respective punch tips of the upper punch 5 and the lower punch 6 are inserted into the dies 4.

The vertical shaft 2 is formed hollow, and a rotary joint 9 for supplying a compression air and a control oil mentioned below to a target position is attached to a lower end of the vertical shaft 2. The rotary joint 9 is provided with a cylindrical main body 10 attached to the vertical shaft 2, and a rotary shaft 11 serving as a rotating shaft of the rotating main body 10. The main body 10 is provided with an oil passage being passed the control oil and an air passage being passed the compression air therein. On the contrary, the rotary shaft 11 is provided with an oil introduction path communicated with the oil passage, and an air introduction path communicated with the air passage. A high-pressure oil supplying apparatus 12 is connected to the oil introduction path, and a compressor 26 (shown in FIG. 2) is connected to the air introduction path.

Figure 2:
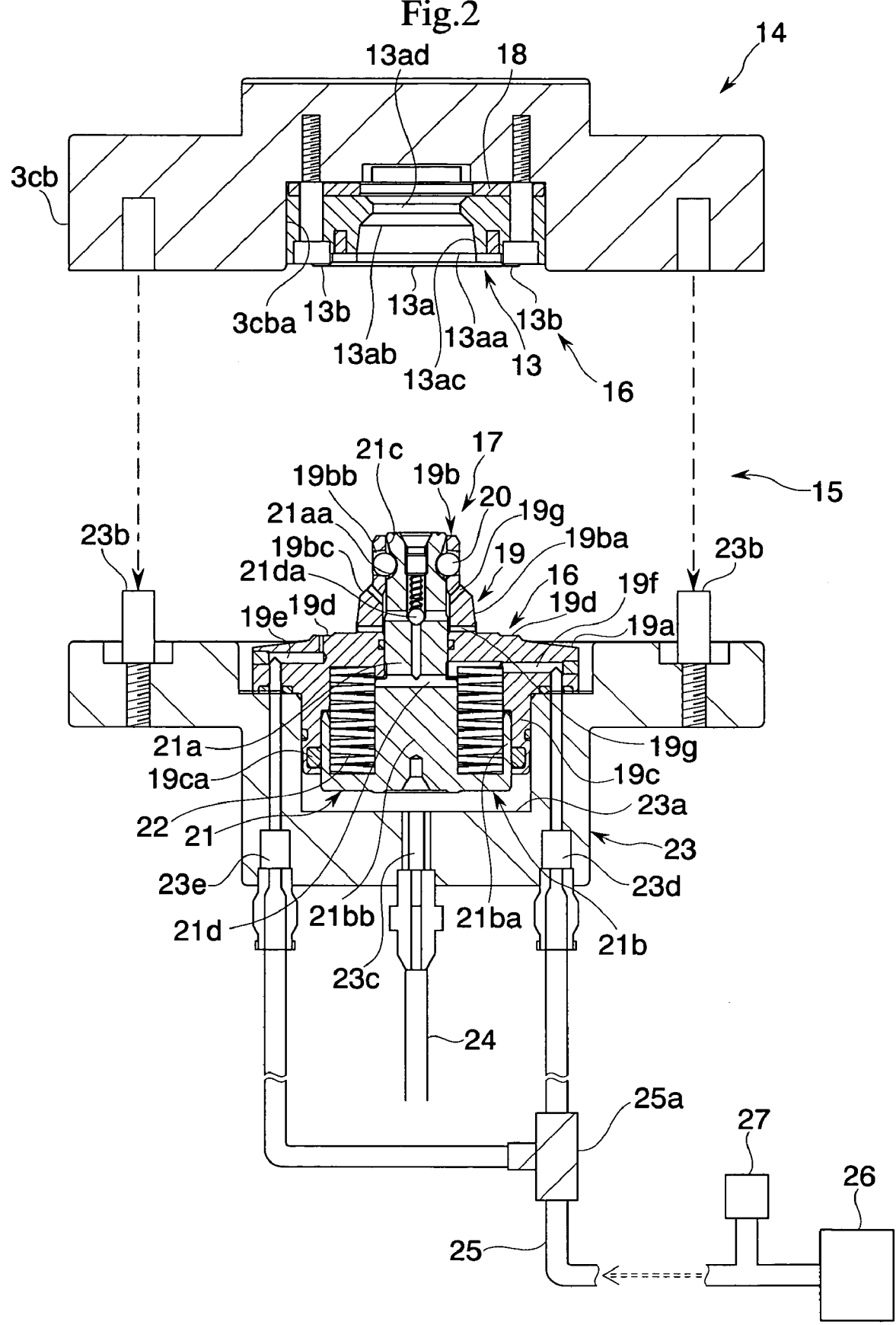
FIG. 2 is a cross sectional view showing a main portion in an enlarged manner in a state before a vertical shaft and a rotary turret in accordance with the embodiment are coupled.
Figure 3:
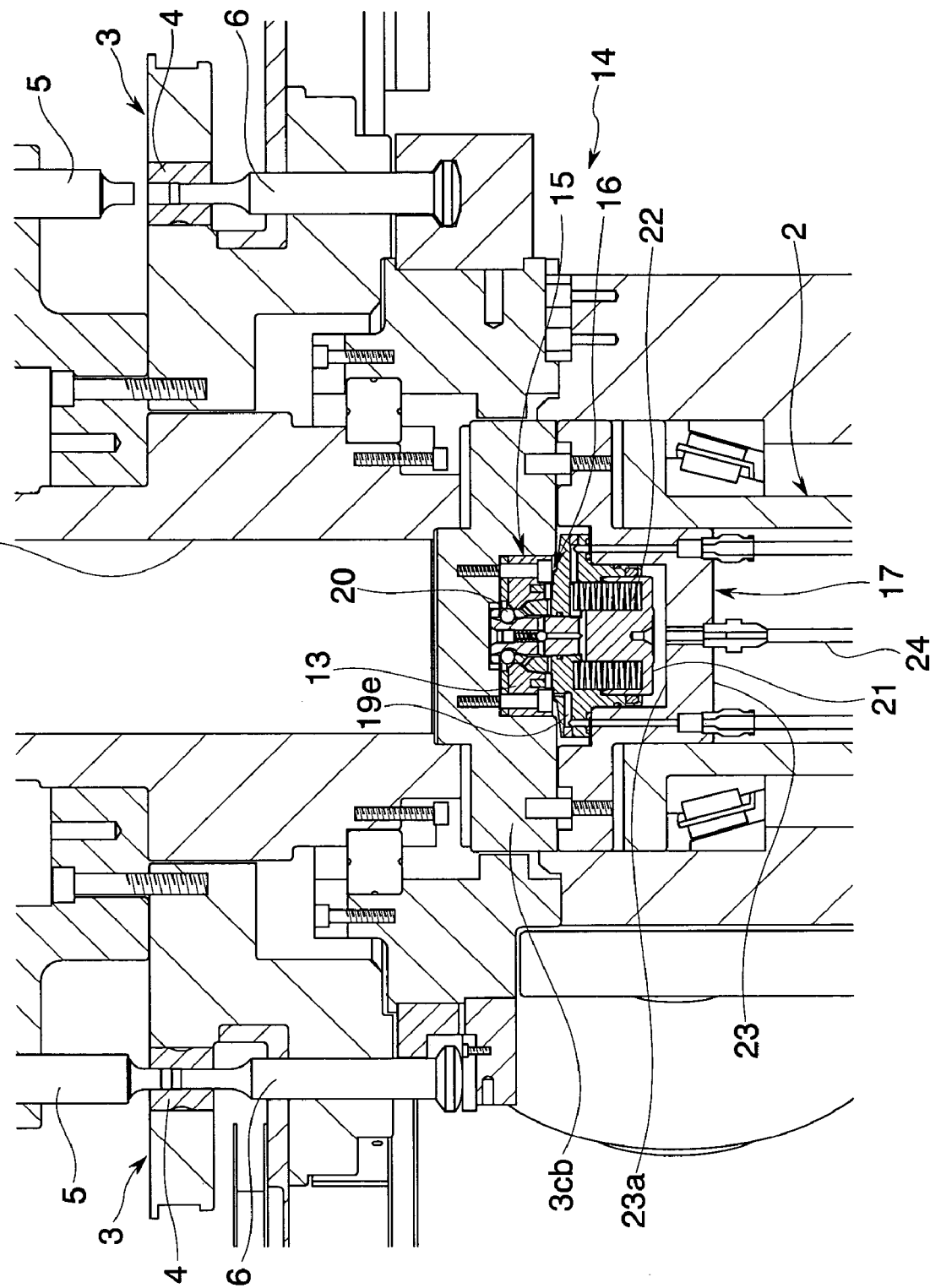
FIG. 3 is a cross sectional view showing a main portion in an enlarged manner in a state in which the coupling between the vertical shaft and the rotary turret in accordance with the embodiment is cancelled.
Figure 4:
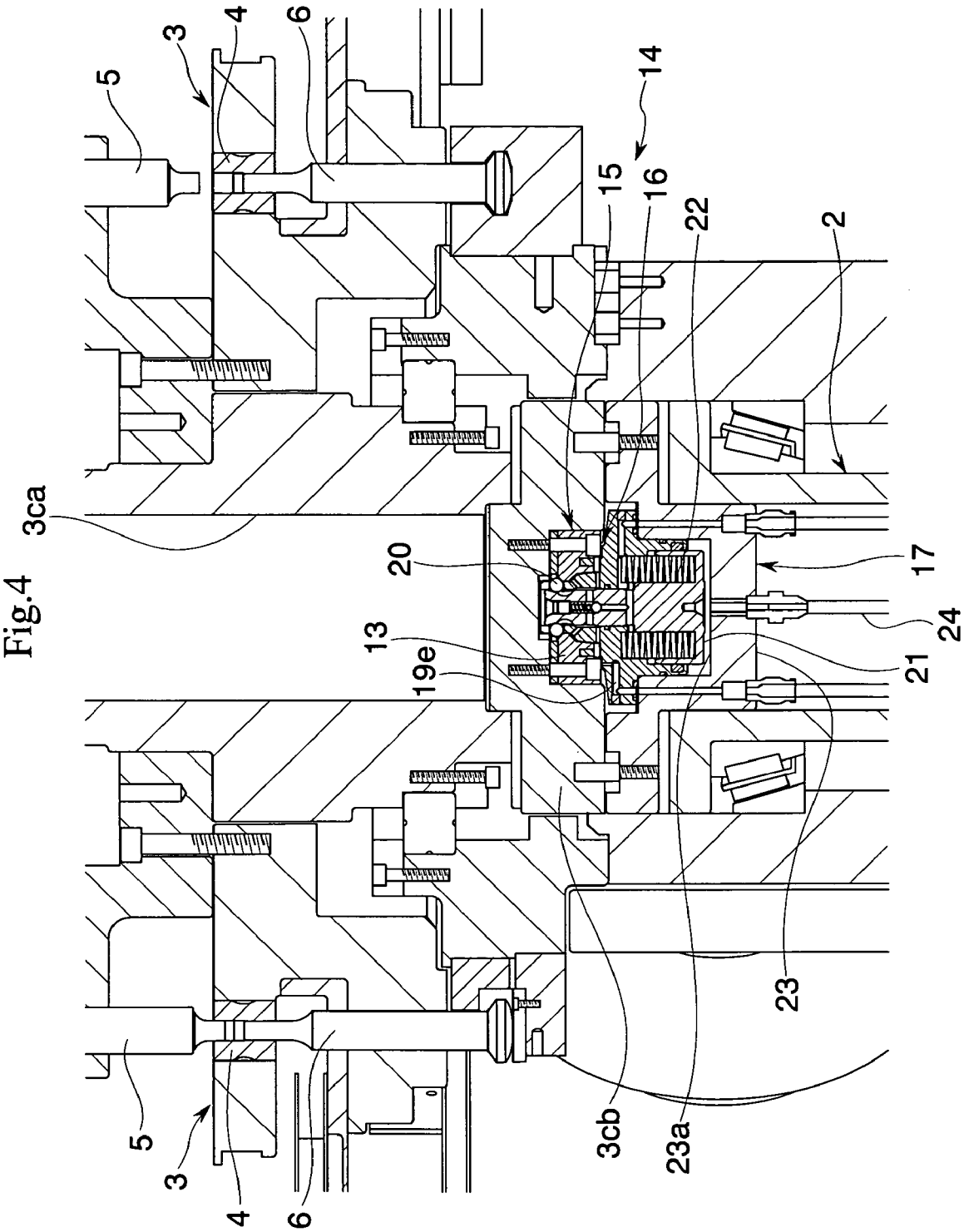
FIG. 4 is a cross sectional view showing a main portion in an enlarged manner before a state in which the vertical shaft and the rotary turret in accordance with the embodiment are coupled.

The rotary turret 3 is provided with an upper rotary turret portion 3a holding the upper punch 5, a lower rotary turret portion 3b to which the die 4 is detachably attached and holding the lower punch 6, and a shaft portion 3c arranged so as to couple the upper rotary turret portion 3a and the lower rotary turret portion 3b. The shaft portion 3c substantially serves as a part of the vertical shaft 2 in the case that the rotary turret 3 is coupled to the vertical shaft 2. The shaft portion 3c is provided with a hollow shaft main body 3ca, a ring mounting plate 3cb attached to a lower end of the shaft main body 3ca and to which a locate ring 13 of a constrained member of a coupling mechanism 15 mentioned below is attached, and a suspending shaft 3cc for coupling a suspending device at a time of suspending the rotary turret 3. The ring mounting plate 3cb is provided with a concave portion 3cba open toward a lower side around an axis of the shaft main body 3ca, as shown in FIG. 2. The concave portion 3cba is formed at an inner diameter approximately equal to an outer diameter of the locate ring 13, and a depth approximately equal to a thickness of the locate ring 13.

Two pairs of upper rolls 7 and lower rolls 8 are respectively provided for a main compression and a precompression. In this case, in FIG. 1, the upper roll 7 and the lower roll 8 for the precompression are illustrated, and the upper roll and the lower roll for the main compression are not illustrated. Further, the upper rolls for the precompression and the main compression are attached to a special mounting block. This is that the respective upper rolls can be easily moved from a predetermined position at a time of operating to a retracted position mentioned below. In other words, if the respective upper rolls are at the fixed positions in the case of making the rotary turret 3 in a state of being separated from the vertical shaft 2, it is impossible to lift the rotary turret 3. Accordingly, in the case of separating the rotary turret 3 from the vertical shaft 2 for bringing the rotary turret 3 out of the machine, the mounting block mentioned above is moved to the retracted position set near the external side from the fixed position so as to prevent the respective upper rolls from being an obstacle for lifting the rotary turret 3.

The frame 1, the vertical shaft 2, the rotary turret 3, the die 4, the upper and lower punches 5 and 6, the mechanism for guiding the upper and lower punches 5 and 6, the mechanism for supplying the powder, the mechanism for taking out the molded product, the mechanism for rotating the vertical shaft 2 and the like may be basically identical with the structures which are well known in this field. In this case, in order to facilitate the detachment of the rotary turret 3, the upper punch 5 and the mechanism for guiding the upper punch 5 are structured such as to move together with the rotary turret 3 in the case of lifting the rotary turret 3.

In addition to the structure mentioned above, the molding machine in accordance with the embodiment is provided with a joint apparatus 14 coupling the vertical shaft 2 and the rotary turret 3 so as to be able to detach the rotary turret 3 from the vertical shaft 2. The joint apparatus 14 is provided with a coupling mechanism 15 and a coupling detecting mechanism 16, as shown in FIG. 2.

The coupling mechanism 15 is provided with the locate ring 13 which is attached within the concave portion 3cba of the ring mounting plate 3cb of the shaft portion 3c constituting the rotary turret 3, and a constraining means 17 which is attached to a opposite position to the locate ring 13, that is, an upper end of the vertical shaft 2 so as to constrain the locate ring 13 on the basis of an elastic force and operate in an opposite direction to the elastic force, and cancels the constrained state by a supply of a control fluid corresponding to a fluid having a fluid pressure over the elastic force.

The locate ring 13 is constituted by a cylinder or a thick disc, and is provided with a through hole 13a in a center in a diametrical direction. The through hole 13a is provided with a taper surface portion 13ac defined by a large inner diameter portion 13aa positioned in a lower side and a small inner diameter portion 13ab having a diameter smaller than the diameter of the large inner diameter portion 13aa and positioned in an upper side, in a state in which the locate ring 13 is attached to the ring mounting plate 3cb, and an annular convex portion 13ad having a diameter smaller than the diameter of the small inner diameter portion 13ab of the taper surface portion 13ac, positioned above the small inner diameter portion 13ab and protruding to the interior thereof. The annular convex portion 13ad is structured such that an inner diameter is smaller than the small inner diameter portion 13ab, and a cross sectional shape is formed approximately in a trapezoidal shape. Further, the locate ring 13 is provided with a contact surface of the case 19 of the constraining means 17 mentioned below, that is, an annular contact surface 13b serving as a coupling detecting mechanism 16 in cooperation with a seat reference surface 19d, in a portion near an outer periphery of a lower surface of the locate ring 13. In this case, when attaching the locate ring 13, a washer 18 for adjusting a height is used between the locate ring 13 and the ring mounting plate 3cb.

The constraining means 17 is provided with the case 19 having a projection portion 19b including a taper outer surface 19ba corresponding to the taper surface portion 13ac of the locate ring 13, a plurality of spherical bodies 20 held so as to be movable in a position near the taper outer surface 19ba of the projection portion 19b, a spherical body pressing member 21 having a rod portion 21a arranged within the case 19 and pressing each of the spherical bodies 20 against the annular convex portion 13ad in the case that the rotary turret 3 and the vertical shaft 2 are in a coupling state, and a transmission portion 21b arranged within the case 19 in a state of being partly exposed from the interior of the case 19 and coupled to the rod portion 21a, a disc spring 22 corresponding to an elastic body supplying an elastic force to the spherical body pressing member 21, and a base member 23 having a concave portion 23a capable of installing the case 19 in the portion where the spherical body pressing member 21 is exposed in a liquid tight manner.

The case 19 is attached to the base member 23 mounted to an upper end of the vertical shaft 2. The case 19 is structured such that the projection 19b is provided in a center portion of an upper surface of a thick disc-shaped flange portion 19a, and a cylinder portion 19c having no bottom is provided in a lower surface of the flange portion 19a. An annular contact surface, that is, a seat reference surface 19d, serving as the coupling detecting mechanism 16 in correspondence to the contact surface 13b of the locate ring 13 and in cooperation therewith, and having a width and diameter similar to those of the contact surface 13b, is formed in an upper surface of the flange portion 19a. The projection portion 19bis provided with a hollow portion having an approximately cylindrical shape, and is structured such that a rod portion 21a can be inserted to an inner portion of the hollow portion. The projection portion 19b has a holding hole 19bb provided in a lateral direction for holding the spherical body 20 near an upper end of the projection portion 19b, and is provided with a taper outer surface 19ba in a lower side of the holding hole 19bb. The holding hole 19bb is a hole having a circular truncated cone shape in which an inner diameter is increased toward a center axis of the projection portion 19b, and is structured such that the spherical body 20 can retract toward the center axis at a time of canceling the constraint between the locate ring 13 and the constraining means 17. FIG. 2 illustrates a state in which the spherical body 20 is retracted. In this embodiment, a shoulder portion 19bc to continue in the taper outer surface 19ba is provided between the taper outer surface 10ba and the holding hole 19bb. The shoulder portion 19bc serves as a guide surface for feeding a compression air of a cleaning gas, to the taper outer surface 19ba and the annular convex portion 13ad. A seal member 19ca is attached to an inner surface of the cylinder portion 19c. for improving a liquid tightness to the spherical body pressing member 21.

The case 19 having the structure mentioned above is provided with a detecting air passage 19e supplying compression air of the gas for detecting the matter that the locate ring 13 is constrained by the constraining means 17, that is, the matter that the rotary turret 3 and the vertical shaft 2 are coupled, to the seat reference surface 19d. The detecting air passage 19e constitutes the coupling detecting mechanism 16, and is structured such that one end is open to the seat reference surface 19d and the other end is open to a lower surface of the flange portion 19a. Further, in addition thereto, a cleaning air passage 19f for supplying the compression air to a target position for the purpose of cleaning the taper surface portion 13ac and the taper outer surface 19ba and cleaning the annular convex portion 13ad is formed in an inner portion of the flange portion 19a. The cleaning air passage 19f is structured such that one end is open to a lower surface of the flange portion 19a, and the other end is open to an inner surface of the projection portion 19b. Reference symbol 19g denotes an injection passage of the compression air for cleaning.

The spherical body pressing member 21 is provided with a transmission portion 21b having a structure in which a cylindrical column 21bb having a smaller diameter than an inner diameter of a cylinder 21ba is provided in a center portion of the cylinder 21ba having a bottom, and a rod portion 21a integrally formed in the cylindrical column 21bb of the transmission portion 21b. The cylindrical column 21bb is integrally formed with the cylinder 21ba, and is formed higher than the cylinder 21ba. The transmission portion 21b is provided with a space holding a disc spring 22 between the cylinder 21ba and the cylindrical column 21bb. An outer diameter of the transmission portion 21b corresponds to an inner diameter of the cylinder portion 19c existing in the flange portion 19a of the case 19, and is structured such that a part of a lower side is exposed from the case 19 in the case that the transmission portion 21b is assembled in the case 19.

The rod portion 21a is formed approximately in a cylindrical shape as a whole except the portion near the upper end, and plurality of concave portion 21aa each for retracting the spherical body 20 are provided near the upper end. Each of the concave portions 21aa is provided in correspondence to the spherical body 20, and has a depth at which an outward surface of the spherical body 20 is approximately flush with the outer opening of the holding hole 19bb provided in the projection portion 19b of the case 19 when the spherical body 20 is retracted. In the rod portion 21, a tapered pressing surface 21c narrowed toward the transmission portion 21b for pressing out the spherical body 20 to the outer side of the holding hole 19bb is formed between the concave portion 21aa and the upper end.

The disc spring 22 generates an elastic force, that is, an urging force so as to push down the spherical body pressing member 21 downward, that is, to the direction of the vertical shaft 2. Further, the urging force is set at a strength enough to push out the spherical body 20 from the holding hole 19bb to the outer side, in the case that the disc spring 22 pushes down the spherical body pressing member 21, and the strength at which the disc spring 22 is not easily pushed back.

The base member 23 is attached to the upper end of the vertical shaft 2, and the case 19 is attached in a state in which the cylinder portion 19c of the case 19 is installed in a liquid tight manner in the concave portion 23a provided in the center portion thereof. Positioning pins 23b are provided in the upper surface of the base member 23, for example, at two positions. Further, a hydraulic pipe path through hole 23c is provided in a bottom portion of the concave portion 23a, in such a manner that the control oil can be filled at a larger hydraulic pressure than the urging force of the disc spring 22 via a hydraulic pipe path 24 arranged in a cavity portion of the vertical shaft 2. Further, a bottom portion facing to the cavity portion of the vertical shaft 2 is provided with a first through hole 23d for introducing the compression air for cleaning and a second through hole 23e for introducing the compression air for detecting the coupling. An air pipe path 25 is selectively connected to each of the first through hole 23d and the second through hole 23e when a transfer valve 25e is switched.

In the spherical body pressing member 21 having the structure mentioned above, there is provided an inner portion air passage 21d for supplying the compression air supplied via the cleaning air passage 19f provided in the case 19 to the shoulder portion 19bc and the lower end portion of the taper outer surface 19ba. To the inner portion air passage 21d, there is attached a check valve 21da for preventing the compression air from being supplied to the target position in the case that the pressure of the compression air is low. It is possible to securely prevent the foreign matter which is expected to be left in each of the positions from being attached, by installing the check valve 21da mentioned above.

In the structure mentioned above, as the main portion is shown in an enlarged manner in FIG. 2, in the case that the rotary turret 3 is not installed in the vertical shaft 2, the high-pressure oil supply apparatus 12 provided within the frame 1 is operated, and the high-pressure control oil is filled in the concave portion 23a of the base member 23. Accordingly, the control oil pressure is applied to the transmission portion 21b of the spherical body pressing member 21 in an opposite direction to the urging force of the disc spring 22 by the control oil, and the spherical body pressing member 21 of the constraining means 17 ascends against the urging force of the disc spring 22 and is held at the position. In the state in which the spherical body pressing member 21 exists at the ascending position, each of the spherical bodies 20 enters into the corresponding concave portion 21aa of the rod portion 21a. Therefore, an outer diameter of a position from the upper end of the rod portion 21a to the shoulder portion 19bc looks like being approximately equal to or slightly smaller than an inner diameter of the annular convex portion 13ad of the locate ring 13.

As mentioned above, after the rotary turret 3 is carried within the machine and is positioned with the vertical shaft 2 in a state in which the spherical bodies 20 exist at the retracted position, the rotary turret 3 is descended so as to be coupled to the vertical shaft 2. Further, the rotary turret 3 is mounted on the vertical shaft 2 in such a manner that the locate ring 13 is mounted on the case 19, by positioning by means of the positioning pin 23b (shown in FIG. 3).

Thereafter, the high-pressure oil supply apparatus 12 is stopped, and the control oil is discharged from the concave portion 23a of the base member 23. Accordingly, since the pressure against the urging force of the disc spring 22 disappears, the spherical body pressing member 21 is descended on the basis of the urging force. At this time, the compression air is supplied to the cleaning air passage 19f and the inner air passage 21d via the air pipe path 25 from a compressor 26 serving as a supply source of the compression air. The supplied compression air flows along the taper surface 13ac portion and the taper outer surface 19ba from the shoulder portion 19bc, and flows into a gap formed between the seat reference surface 19d and the contact surface 13b. The compression air flows continuously by the gap while the locate ring 13 is not completely constrained by the constraining means 17.

Further, in accordance that the spherical body pressing member 21 is descended on the basis of the urging force of the disc spring 22, the spherical bodies 20 are pushed out to the outer side from the holding holes 19bb. The pushed-out spherical bodies 20 are brought into contact with the upper surface of the annular convex portion 13ad of the locate ring 13, and applies a downward force to the locate ring 13.

Accordingly, the locate ring 13 is pushed down. When the locate ring 13 is pushed down, the taper surface portion 13ac is guided by the taper outer surface 19ba of the projection portion 19b, and the position of the locate ring 13 is regulated. Further, the taper outer surface 19ba and the taper surface portion 13ac are brought into close contact with each other, whereby the locate ring 13 is constrained by the constraining means 17, so that the rotary turret 3 is coupled to the vertical shaft 2 (shown in FIG. 4).

In the coupling work mentioned above, the compression air from the cleaning air passage 19f is supplied to the taper surface portion 13ac and the taper outer surface 19ba via the shoulder portion 19bc, it is possible to prevent the foreign matter from being attached to the taper surface portion 13ac and/or the taper outer surface 19ba on the basis of the compression air, and it is possible to blow away the attached foreign matter. Accordingly, it is possible to avoid an unnecessary action that the coupling work is repeated due to the foreign matter pinched between the surfaces, and it is possible to facilitate the coupling work so as to shorten the time.

At the same time, the compression air is fed to the seat reference surface 19d and the contact surface 13b via the inner air passage 21d. Since the gap is formed between the seat reference surface 19d and the contact surface 13b until the locate ring 13 is constrained by the constraining means 17, the supplied compression air flows toward the outer side of the flange portion 19a from the gap. Further, when the constraint is finished, the contact surface 13b is brought into close contact with the seat reference surface 19d. Accordingly, it is possible to inhibit the compression air from flowing out to the outer side of the flange portion 19a. As a result, the pressure of the compression air of the inner air passage 21d is increased. Therefore, it is possible to detect the constraint of the locate ring 13 by the constraining means 17, that is, the coupling state between the rotary turret 3 and the vertical shaft 2, by detecting the pressure change of the compression air, for example, by a pressure gauge 27 or a pressure sensor. In this case, the transfer valve 25a attached to the air pipe path 25 maybe switched at a time point of stopping the high-pressure oil supply apparatus 12 or directly after the stop, whereby the compression air is supplied to the cleaning air passage 19f.

In a state in which the rotary turret 3 is coupled to the vertical shaft 2, the locate ring 13 attached to the rotary turret 3 is urged downward by the constraining means 17 so as to be constrained. Further, since the locate ring 13 is elastically deformed and the taper surface portion 13ac is brought into close contact with the taper outer surface 19ba, it is possible to increase a rigidity in the constrained state.

Accordingly, in the case that the molding machine is operated, that is, the vertical shaft 2 is rotated and the rotary turret 3 is rotated, the rotary, turret 3 does not float up even if the rotary turret 3 is not pressed against the vertical shaft 2 as is different from the conventional structure. Therefore, since the mechanism for applying the load to the rotary turret 3 is not necessary, it is possible to simplify the structure of the molding machine, and make the structure compact.

The cancellation of the coupling between the vertical shaft 2 and the rotary turret 3 may be executed by actuating the high-pressure oil supply apparatus 12 so as to supply or charge the control oil to the concave portion 23a of the base member 23. In this case, if the compression air is supplied to the detecting air passage 19e constituting the coupling detecting mechanism 16, it is possible to detect the fact that the coupling is cancelled on the basis of the pressure of the compression air. Further, it is possible to prevent the foreign matter from being attached to the taper surface portion 13ac and the taper outer surface 19ba, by switching the transfer valve 25a immediately after detecting the coupling cancellation and supplying the compression air to the cleaning air passage 19f.

In this case, in the embodiment mentioned above, the coupling between the rotary turret 3 and the vertical shaft 2 is detected by detecting the change of the pressure of the compression air, however, may be detected by detecting the flow rate of the compression air. Further, in the structure in which the interior of the molding machine can be washed by water, a water supplied at a predetermined water pressure may be used in place of the compression air.

Further, in the embodiment mentioned above, the description is given of the structure in which the constraining means 17 is attached to the vertical shaft 2, however, may be attached to the rotary turret 3.

In addition, a particular structure of each of the portions is not limited to the embodiment mentioned above, but may be variously modified within the scope of the present invention.

The invention claimed is:

1. A rotary powder compression molding machine in which a rotary turret is provided within a frame via a vertical shaft so as to be horizontally rotatable, a plurality of dies are provided in the rotary turret at a predetermined interval, an upper punch and a lower punch are held kept above and below each of the dies so as to be vertically slidable, a powder filled in the die is compressed and molded by putting the upper punch and the lower punch in which punch tips are inserted into the dies through a portion between an upper roll and a lower roll, comprising a joint apparatus coupling the vertical shaft and the rotary turret so as to be able to detach the rotary turret from the vertical shaft, wherein the joint apparatus comprises:

a coupling mechanism coupling the vertical shaft and the rotary turret while maintaining a state in which the vertical shaft and the rotary turret are constrained in an axial direction of the vertical shaft with each other, and canceling the coupling between the vertical shaft and the rotary turret by canceling the constraining state on the basis of an operation; and a coupling detecting mechanism detecting a fact that the rotary turret is coupled to the vertical shaft by the coupling mechanism, wherein the coupling mechanism comprises:

a constrained member attached to the rotary turret; and a constraining means attached to the vertical shaft so as to constrain the constrained member on the basis of an resilient force, the constraining means actuating in an opposite direction to the resilient force to relieve a constrained state by hem supplied a fluid having a fluid pressure over the resilient force.

2. The rotary powder compression molding machine as claimed in claim 1, wherein the coupling detecting mechanism comprises:

a gas supply means for supplying a gas in such a manner that the constraining means passes between contact surfaces with which the constraining means is brought into contact at a time of constraining the constrained member; and a detecting means for detecting a charge of gas property, the change being caused by a flow of the gas supplied by the gas supplying means being limited by the portion between the connect surfaces.

3. A rotary powder compression molding machine in which a rotary turret is provided within a frame via a vertical shaft so as to be horizontally rotatable, a plurality of dies are provided in the rotary turret at a predetermined interval, an upper punch and a lower punch are held kept above and below each of the dies so as to be vertically slidable, a powder filled in the die is compressed and molded by putting the upper punch and the lower punch in which punch tips are inserted into the dies through a portion between an upper roll and a lower roll, comprising a joint apparatus coupling the vertical shaft and the rotary turret so as to be able to detach the rotary turret from the vertical shaft, wherein the joint apparatus comprises:

a coupling mechanism coupling the vertical shaft and the rotary turret while maintaining a state in which the vertical shaft and the rotary turret are constrained in an axial direction of the vertical shaft with each other, and canceling the coupling between the vertical shaft and the rotary turret by canceling the constraining state on the basis of an operation; and a coupling detecting mechanism detecting a fact that the rotary turret is coupled to the vertical shaft by the coupling mechanism, wherein the coupling mechanism comprises a constrained member attached to one of the rotary turret and the vertical shaft, and a constraining means attached to an opposite position to the constrained member so as to constrain the constrained member on the basis of an resilient force, the constraining means actuating in an opposite direction to the resilient force to relieve a constrained state by being supplied a fluid having a fluid pressure over the resilient force, and wherein the constrained member comprises a through hole, the through hole providing a taper surface portion defined by a large inner diameter portion and a small inner diameter portion having a smaller diameter than the large inner diameter portion, and an annular convex portion having a smaller inner diameter than the small inner diameter portion of the taper surface portion, and the constraining means comprises a case providing a projection portion having a taper outer surface corresponding to the taper surface portion of the constrained member, a plurality of spherical bodies held so as to be movable in a position near the taper outer surface of the projection portion, a spherical body pressing member having a rod portion arranged within the case and pressing each of the spherical bodies against the annular convex portion when the rotary turret and the vertical shaft are in a coupling state, and a transmission portion coupled to the rod portion and arranged within the case in a state of being partly exposed from the interior of the case, a resilient body supplying a resilient force to the spherical body pressing member, and a base member having a concave portion capable of installing the case in the portion where the spherical body pressing member is exposed in a liquid tight manner, thereby relieving the constraint of the constrained member by introducing a fluid to the concave portion of the base member.

4. The rotary powder compression molding machine as claimed in claim 3, wherein the coupling detecting mechanism comprises:

a gas supply means for supplying a gas in such a manner that the constraining means passes between contact surfaces with which the constraining means is brought into contact at a time of constraining the constrained member; and a detecting means for detecting a charge of gas property, the change being caused by a flow of the gas supplied by the gas supplying means being limited by the portion between the connect surfaces.

* * * * *